United States Patent Office 2,837,482
Patented June 3, 1958

2,837,482

ORGANOPOLYSILOXANE LUBRICANTS

Maynard C. Agens, Schenectady, N. Y., assignor to General Electric Company, a corporation of New York No Drawing. Application November 18, 1955
Serial No. 547,839

4 Claims. (Cl. 252—49.6)

The present invention relates to organopolysiloxanes having increased lubricity and is a continuation-in-part of my application Serial No. 151,530, filed March 23, 1950, now abandoned, and assigned to the same assignee as the present invention.

More particularly, this invention is concerned with a composition of matter comprising a liquid organo-substituted polysiloxane, for example, a liquid, non-resinous organo-substituted polysiloxane containing an average of from 1.9 to 2.67 organic groups per silicon atom, and having incorporated therein a chlorinated aromatic compound selected from the class consisting of octyltetrachlorobenzoate, dioctyltetrachlorophthalate (bis-2-ethylhexyl tetrachlorophthalate), and mixtures thereof.

Liquid organo-substituted polysiloxanes are compositions comprising essentially silicon atoms connected to one another by oxygen atoms as illustrated by the following structure called a siloxane structure:

wherein a preponderant number of the valences of the silicon atoms are satisfied by the substitution thereon of organic radicals. These compositions of matter may be prepared, for example, by the hydrolysis of hydrolyzable organo-substituted silanes, e. g., dihydrocarbon-substituted dihalogenosilanes, for instance, dimethyldichlorosilane, followed by complete or partial condensation of the hydrolysis product. They may also be prepared by hydrolyzing mixtures of hydrolyzable diorgano-substituted silanes among themselves or with hydrolyzable silanes containing, for example, three organic radicals substituted on the silicon atom, for instance, trimethylchlorosilane. More specific directions for the hydrolysis of hydrolyzable organo-substituted silanes to form liquid organo-substituted polysiloxanes may be found, e. g., in Patnode Patent 2,469,888, issued May 10, 1949, and Wilcock Patent 2,483,158, issued September 27, 1949, both patents being assigned to the same assignee as the present invention.

By the term "hydrolyzable organo-substituted silanes" is intended to mean derivatives of $SiH_4$ which contain hydrolyzable groups or radicals, e. g., halogens, amino groups, alkoxy, aryloxy, and acyloxy radicals, etc., in addition to the organic groups substituted directly on the silicon atom that are joined to the silicon through carbon-silicon linkages. Examples of such organic radicals are aliphatic radicals, including alkyl radicals, e. g., methyl, ethyl, propyl, butyl, etc.; alicyclic radicals, e. g., cyclopentyl, cyclohexyl, etc.; aryl radicals, e. g., phenyl, diphenyl, anthrocyl, naphthyl, etc.; aralkyl radicals, e. g., tolyl, xylyl, etc.; alkenyl radicals, etc., as well as hydrolyzable silanes containing two different organic radicals, e. g., methyl and phenyl radicals, etc., attached to the silicon atom. If desired, the above-mentioned radicals may also contain substituents substituted thereon, for instance, halogens.

Hydrolysis of the above silanes or mixtures of the silanes results in the formation of silanols, i. e., organo-substituted silanes containing hydroxy groups substituted directly on the silicon, which hydroxy groups almost immediately condense intermolecularly (intercondense) splitting out water to give the siloxane linkages mentioned previously. Such intercondensations are accelerated by acidic materials, e. g., sulfuric acid, hydrochloric acid, ferric chloride, etc., as well as by basic materials, e. g., sodium hydroxide, ammonium hydroxide, potassium hydroxide, etc. As a result of the hydrolysis and condensation, organopolysiloxanes may be produced which are partially or completely condensed and which may have on the average up to as high as three organic radicals substituted per silicon atom. The liquid organopolysiloxanes, i. e., liquid organo-substituted polysiloxanes, prepared in this manner consist essentially of silicon atoms joined together by oxygen atoms through silicon-oxygen linkages and organic radicals attached to silicon through carbon-silicon linkages, the remaining valences, if any, of the silicon atoms being satisfied by hydroxyl radicals and/or by residual unhydrolyzed radicals such as the hydrolyzable radicals listed previously.

The viscosity of the liquid organopolysiloxanes obtained in the above fashion may vary, for instance, depending, e. g., upon the starting materials, hydrolysis medium, temperature, etc. These materials have good resistance to the effect of heat for great lengths of time at temperatures of the order of 100° to 150° C. At these temperatures they resist decomposition much better for longer periods of operation than other organic non-silicon-containing liquid materials, as, for example, mineral oils, organic esters, vegetable oils, etc.

Although organopolysiloxanes have good lubricity in many applications, it has been found that when such organopolysiloxane lubricants are employed in applications where a heavy load is placed on the bearing surfaces, there is a tendency for the liquid organopolysiloxane to be squeezed out. This is a serious defect since under such circumstances there may be a lack of protection against wear of the bearing members, and because of this lack of protection there may occur what is known as "freezing" or bearing seizure of the revolving member or shaft supported by the bearings. Generally, petroleum base oils of similar viscosities are not subject to this defect. This disparity in lubrication properties of organopolysiloxanes is particularly pronounced where both rubbing surfaces are steel. The inability of the liquid organopolysiloxane to maintain a continuous lubricating film on the steel surfaces when the load on the bearings has been increased above a certain critical point is very serious, and in some measure has limited the usefulness of liquid organopolysiloxanes as lubricants.

In order to improve the operating characteristics of liquid organopolysiloxanes when employed as lubricants on bearing surfaces which are subjected to heavy loads, various additives were incorporated into liquid organopolysiloxanes. These additions included some of the conventional additives for petroleum base oils as well as the additives of the present invention. Preliminary examination of liquid organopolysiloxanes containing the conventional additives for petroleum base oils indicated that these compositions were satisfactory as lubricants under heavy loads. However, it was subsequently found that these compositions were unsatisfactory for long term lubrication since they tended to deteriorate rapidly and lose their lubricating effect.

The primary object of this invention is to provide liquid organopolysiloxane lubricants capable of adequately lubricating the bearing surfaces of moving metallic bodies even under increased loads and capable of being employed for extended periods of time without deterioration of the lubricating characteristics. These liquids are characterized by high resistance to oxidation, little change of viscosity with temperature and low pour points. Other objects and advantages of the present invention will become apparent from the following description and claims.

Unexpectedly, I have now found that the frictional properties of liquid organo-substituted polysiloxanes, especially liquid hydrocarbon-substituted polysiloxanes, having an average of from 1.9 to 2.67, more particularly from approximately 1.95 to 2.3 hydrocarbon groups per silicon atom, may be greatly improved by incorporating in the said liquid polysiloxane a minor proportion, preferably a small amount, of a compound selected from the class consisting of octyltetrachlorobenzoate, dioctyltetrachlorophthalate and mixtures of said compounds. I have further found that the compositions of the present invention retain their lubricating characteristics for extended periods of time under heavy loads.

Where mixtures of octyltetrachlorobenzoate and dioctyltetrachlorophthalate are incorporated into liquid organopolysiloxanes I have found that any ratio of the two additives may be employed. However, I prefer to employ mixtures consisting of from 25 to 95 percent by weight of octyltetrachlorobenzoate based on the total weight of the mixture with the remainder of the mixture being dioctyltetrachlorophthalate. My preferred specific additive mixture is about 26 parts by weight of octyltetrachlorobenzoate and 74 parts by weight of dioctyltetrachlorophthalate.

The amount of additive which may be added to the liquid organopolysiloxane may be varied within wide limits without departing from the scope of the invention. Generally, a minor proportion is employed and preferably an amount of the additive is used which is soluble at normal temperatures in the liquid organopolysiloxane. A useful range which I have found can be employed for these additives is one ranging from about 0.5 to 25 percent, by weight, preferably from 1 to 10 percent, based on the weight of the liquid organopolysiloxane. The amount of such additive which can be employed may be varied depending upon the organopolysiloxane used, the degree of solubility of the additive in the organopolysiloxane, etc.

In order that those skilled in the art may better understand how the present invention may be practiced, the following examples are given by way of illustration and not by way of limitation. All parts are by weight.

In the following Examples 1 to 5, various additives were added to different organipolysiloxanes intended as lubricants. These mixtures were then tested for their lubricity properties on a Shell four ball wear tester which comprises a device for holding three rigidly clamped ½" metal balls submerged in a lubricant in a metal cup. A fourth rotating ball of the same diameter is then pressed into contact with the three stationary balls by an adjustable loading arm and allowed to rub for one hour. The contact points on the three stationary balls grow to circular scars as wear progresses. The average diameter of these scars in millimeters (mm.) after an hour's run at some particular speed and load is taken as the measurement of wear. The temperature at which the test is conducted may also be varied from room temperature to elevated temperatures of the order of about 150° C. The type of metal employed in the balls can be changed as, for example, lubricating surfaces can be steel on steel, or steel on brass, or brass on steel.

EXAMPLE 1

In this example a methylpolysiloxane oil (viscosity of about 300 centistokes) comprising a linear dimethylpolysiloxane chain-stopped at each end with trimethylsilyl groups and more particularly described in the aforementioned Patnode Patent 2,469,888 as well as in another Patnode Patent 2,469,890, was mixed with 2.5 percent, by weight, thereof of dioctyltetrachlorophthalate or 3 percent by weight of various mixtures of dioctyltetrachlorophthlate and octyltetrachlorobenzoate. These mixtures were tested on the Shell four ball tester previously described at a speed of 600 R. P. M. at room temperature for one hour with 20 kg. loads unless indicated with the results shown in Table I.

Table I

| Additive | Steel, mm. | Brass, mm. |
| --- | --- | --- |
| None | 1.49 | 1 2.33 |
| Dioctyltetrachlorophthalate | 1.36 | 1.53 |
| Dioctyltetrachlorophthalate-octyltetrachlorobenzoate (25–75) | .45 | .63 |
| Dioctyltetrachlorophthalate-octyltetrachlorobenzoate (50–50) | .44 | .61 |
| Dioctyltetrachlorophthalate-octyltetrachlorobenzoate (74–26) | .46 | .69 |
| Dioctyltetrachlorophthalate-octyltetrachlorobenzoate (8–92) | .43 | .69 |

1 10 kg. load.

EXAMPLE 2

In this example a methyl polysiloxane oil similar to the one employed in Example 1 with the exception that the viscosity of this oil was about 70 centistokes was mixed with 3 percent, by weight, thereof of a mixture of dioctyltetrachlorophthalate and octyltetrachlorobenzoate (74–26) and tested in the Shell four ball tester at 600 R. P. M. for one hour at room temperature to give a value of about .41 mm. under a 10 kg. load, a value of .46 mm. for a 20 kg. load, both of the latter values being for steel on steel, and a value of .43 mm. and .67 mm. for 10 kg. and 20 kg., respectively, for steel on brass. Tests conducted on the methyl polysiloxane oil without the additives showed it to have a value of .48 mm. under a 10 kg. load for steel on steel and 2.26 mm. for a 10 kg. load for steel on brass.

EXAMPLE 3

In this example a methyl polysiloxane oil similar to that used in Example 1 with the exception that it had a viscosity of about 40 centistokes was mixed with 3 percent, by weight, of a mixture of dioctyltetrachlorophthalate and octyltetrachlorobenzoate (74–26) and tested as in Example 1 to give a value of .45 mm. under a 20 kg. load for steel on steel and .61 mm. under the same load for steel on brass. This same oil without the additive showed a value of about .46 mm. under a 10 kg. load for steel on steel and 2.10 mm. for a 10 kg. load for steel on brass.

EXAMPLE 4

In this example methyl polysiloxane oil similar to that used in Example 1, with the exception that this oil had a viscosity of 20 centistokes instead of 300 centistokes, was mixed with 3 percent, by weight, of a mixture of dioctyltetrachlorophthalate and octyltetrachlorobenzoate (74–26) and tested on the Shell four ball tester as in Example 1 to give a value under a 10 kg. load of .39 mm. for steel on steel and .69 mm. for steel on brass. This same oil without the additive showed an irregular scar of about .46 mm. diameter for steel on steel and 1.47 mm. for steel on brass.

EXAMPLE 5

In this example a linear methylphenyl polysiloxane containing about 15 mol percent silicon-bonded phenyl groups was mixed with 3 percent by weight of a mixture consisting of 24 parts by weight of dioctyltetrachlorophthalate and 76 parts by weight of octyltetrachlorobenzoate and was tested on the Shell four ball tester under the conditions recited in Example 1. This test gave a value for steel on steel of 0.62 mm. and steel on brass of 0.46 mm. When this same methylphenyl silicone oil without the additive was tested under the same conditions, the test gave a value for steel on steel of 1.58 mm. and steel on brass of 3.16 mm.

EXAMPLE 6

This example illustrates the long lubricating life of the compositions within the scope of the present invention. An industrial timing motor in which the rotating shafts were formed of cold drawn No. 416 stainless steel and in which the bearing surfaces are of grade A Phosphor bronze was lubricated with a mixture of a methylpolysiloxane oil similar to that described in Example 3 containing about 3 percent by weight of a mixture consisting of 74 parts by weight of dioctyl tetrachlorophthalate and 26 parts by weight of dioctyltetrachlorobenzoate. The pressure on the bearing surfaces in this timer was about 900 to 1000 pounds per square inch. These timer motors, which are synchronous motors, were operated against a torque load equal to 0.375 pound inches initially. As the test progressed, the applied torque load would become too great for the motor and at this time the torque load was reduced so that the motor would again operate. This continued until the motors failed completely, i. e., the motors would not operate even against a zero torque load. The motors lubricated by the mixture previously described operated for an average of 46.2 months (almost four years) before failure occurred. When these same motors were lubricated and tested under the same conditions with the lubricant consisting of the same methylpolysiloxane oil but containing 3 percent by weight of trichlorobenzene as a lubricity additive, the motors failed after an average of 12.2 months (about one year).

From the above examples, it is obvious that the lubricating properties of the liquid organopolysiloxanes of the type employed in the practice of this invention can unexpectedly be improved by incorporating therein an additive of the type described. By means of my invention lubricating films of liquid organopolysiloxanes can be maintained between rubbing bearing surfaces without excessive wear taking place and with the lubricating effect lasting for a considerably longer period of time than when no additive is employed or when an additive such as trichlorobenzene is employed.

It will, of course, be understood by those skilled in the art that other proportions of the additives of the class previously described may be used in place of the percentages employed in the preceding example without departing from the scope of the invention. Variation of the amount of additive depends on the particular organopolysiloxane employed and on the solubility of the additive in the organopolysiloxane.

The use of the additives in accordance with my invention is especially adaptable for liquid organopolysiloxanes, for instance, the liquid alkyl-substituted polysiloxanes, for example, liquid methyl-, ethyl-, propyl-, butyl-, isopropyl-substituted polysiloxanes, etc.; the liquid aryl-substituted polysiloxanes, e. g., the liquid phenyl-substituted polysiloxanes, etc.; the liquid organopolysiloxanes containing different hydrocarbon groups substituted on the silicon atom or atoms, for example, liquid methyl- and phenyl-substituted polysiloxanes, etc., as well as liquid organopolysiloxanes containing both alkyl and aryl hydrocarbons substituted on different silicon atoms, for example, liquid organopolysiloxanes obtained by hydrolyzing a mixture comprising dimethyldichlorosilane and diphenyldichlorosilane, or dimethyldichlorosilane and methylphenyldichlorosilane which can later or simultaneously be chain-stopped with triorganosilyl groups as disclosed in the aforementioned Patnode patent.

My claimed compositions can be used to make various greases using many of the thickening agents such as soaps ordinarily used for that purpose as thickening agents. These include, for instance, lithium stearate, lithium hydroxy stearate, etc. Other additives may be incorporated in the grease to improve certain properties thereof as, for instance, the use of various oxidation inhibitors, organic diesters, e. g., di-(2-ethylhexyl) sebacate, etc.

What I claim as new and desire to secure by Letters Patent of the United States is:

1. A composition of matter consisting essentially of (1) a liquid organopolysiloxane and (2) from about 0.5 to 25 percent by weight, based on the weight of (1), of a mixture of octyltetrachlorobenzoate and dioctyltetrachlorophthalate.

2. A composition of matter consisting essentially of (1) a liquid hydrocarbon-substituted polysiloxane containing an average of from 1.9 to 2.67 hydrocarbon groups per silicon atom and (2) from 0.5 to 25 percent, by weight, based on the weight of (1) of a mixture of octyltetrachlorobenzoate and dioctyltetrachlorophthalate.

3. A composition of matter constituting essentially of (1) a liquid methylpolysiloxane containing an average of about 1.9 to 2.67 methyl groups per silicon atom and (2) from 1 to 10 percent, by weight, based on the weight of (1) of a mixture of octyltetrachlorobenzoate and dioctyltetrachlorophthalate.

4. A composition of matter consisting essentially of a major portion of a liquid organopolysiloxane and an amount of a mixture of octyltetrachlorobenzoate and dioctyltetrachlorophthalate effective to impart improved lubricating characteristics to said organopolysiloxane under heavy loads.

References Cited in the file of this patent

UNITED STATES PATENTS

| | | |
|---|---|---|
| 2,255,085 | Prutton | Sept. 9, 1941 |
| 2,353,585 | Prutton | July 11, 1944 |
| 2,471,850 | Wilcock | May 31, 1949 |

OTHER REFERENCES

Lincoln: "Chlorine Compounds Added to Lubricants," Ind. & Eng. Chem., vol. 28, October 1936, pages 1191–1197.

Davy: "The Mechanism of Action of Extreme Pressure Lubricants," Scientific Lubrication, September 1949, pages 7–14.